(12) United States Patent
Matsusaka

(10) Patent No.: US 7,584,199 B2
(45) Date of Patent: Sep. 1, 2009

(54) SYSTEM AND SERVER FOR MANAGING SHARED FILES

(75) Inventor: Katsuhiko Matsusaka, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 357 days.

(21) Appl. No.: 10/975,007

(22) Filed: Oct. 28, 2004

(65) Prior Publication Data

US 2005/0289512 A1    Dec. 29, 2005

(30) Foreign Application Priority Data

Jun. 28, 2004    (JP) .............................. 2004-189622

(51) Int. Cl.
*G06F 7/00*    (2006.01)
*G06F 17/00*    (2006.01)

(52) U.S. Cl. ..................... 707/101; 707/203; 717/120

(58) Field of Classification Search ............... 707/1–10, 707/100–104.1, 200–206; 709/217, 219; 717/101, 120

See application file for complete search history.

(56) References Cited

U.S. PATENT DOCUMENTS

| | | | |
|---|---|---|---|
| 5,287,521 A * | 2/1994 | Nitta et al. ................... 710/200 |
| 5,526,524 A * | 6/1996 | Madduri ....................... 710/200 |
| 5,623,659 A * | 4/1997 | Shi et al. ........................ 707/8 |
| 5,781,732 A * | 7/1998 | Adams ........................ 709/205 |
| 6,049,334 A * | 4/2000 | Bates et al. .................. 715/755 |
| 6,088,702 A * | 7/2000 | Plantz et al. ............. 707/103 R |
| 6,212,534 B1 * | 4/2001 | Lo et al. ...................... 715/511 |
| 6,275,935 B1 * | 8/2001 | Barlow et al. ............... 713/182 |
| 6,289,460 B1 * | 9/2001 | Hajmiragha .................. 726/28 |
| 6,314,425 B1 * | 11/2001 | Serbinis et al. ............... 707/10 |
| 6,446,093 B2 * | 9/2002 | Tabuchi ...................... 707/205 |

(Continued)

FOREIGN PATENT DOCUMENTS

JP    5-128117    5/1993

(Continued)

OTHER PUBLICATIONS

Johnston et al., Authorization and attribute certificates for widely distributed access control, Jun. 17-19, 1998, IEEE, 340-345.*

(Continued)

*Primary Examiner*—Jean B Fleurantin
(74) *Attorney, Agent, or Firm*—Buchanan Ingersoll & Rooney PC

(57) ABSTRACT

In a system where files are shared by a plurality of client apparatuses through a network, when an access to a file in the shared files by a first client apparatus is received, it is decided whether the file is under editing by a second client apparatus or not, with reference to file management data. When the accessed file is not edited by a second client apparatus, the second client apparatus editing the file including a portion which the first client apparatus intends to edit, a first graphic user interface is presented for notifying whether the second apparatus permits or rejects editing of the portion by the first client apparatus. When a notification to permit editing of the portion is received, the first client apparatus is allowed to open the file in a status wherein editing of the portion is permitted.

31 Claims, 16 Drawing Sheets

U.S. PATENT DOCUMENTS

| | | | |
|---|---|---|---|
| 6,681,371 B1 * | 1/2004 | Devanbu | 715/515 |
| 6,757,871 B1 * | 6/2004 | Sato et al. | 715/530 |
| 2002/0065848 A1 * | 5/2002 | Walker et al. | 707/511 |
| 2003/0115269 A1 * | 6/2003 | Klug | 709/205 |

FOREIGN PATENT DOCUMENTS

| | | |
|---|---|---|
| JP | 5-225028 | 9/1993 |
| JP | 6-12310 | 10/1994 |
| JP | 6-295299 | 10/1994 |
| JP | 10-55300 | 2/1998 |
| JP | 2001-306382 | 11/2001 |
| JP | 2004-78535 | 3/2004 |

OTHER PUBLICATIONS

Mohania et al., Secured Web access, Nov. 13-16, 2000, IEEE, 182-189.*

Notification of Reasons of Refusal, mailed Sep. 25, 2007, issued in corresponding Japanese Patent Application No. 2004-189622.

* cited by examiner

Fig.14

```
SHARED FILE MANAGEMENT SYSTEM                                    [X]
ANOTHER USER REQUESTS ASSIGNMENT OF EDITING RIGHT TO FOLLOWING
PORTIONS. SELECT REJECTION OR PERMISSION. IN CASE OF REJECTION,
YOU CAN NOTIFY THE REASON OF REJECTION.

START POINT 1: | PAGE 7    LINE 12   PLACE 8  |

END POINT 1: | PAGE 13   LINE 2    PLACE 26 |   [REJECT] [PERMIT]

START POINT 2: | PAGE 26   LINE 18   PLACE 25 |

END POINT 2: | PAGE 28   LINE 24   PLACE 38 |   [REJECT] [PERMIT]

[REJECT ALL] [PERMIT ALL]
```

Fig.15

```
SHARED FILE MANAGEMENT SYSTEM                                    [X]
ANOTHER USER REQUESTS ASSIGNMENT OF EDITING RIGHT TO FOLLOWING
PORTIONS. SELECT REJECTION OR PERMISSION. IN CASE OF REJECTION,
YOU CAN NOTIFY THE REASON OF REJECTION.

START POINT 1: | PAGE 7    LINE 12   PLACE 8  |

END POINT 1: | PAGE 13   LINE 2    PLACE 26 |   [REJECT] [PERMIT]

START POINT 2: | PAGE 26   LINE 18   PLACE 25 |

END POINT 2: | PAGE 28   LINE 24   PLACE 38 |   [REJECT] [PERMIT]

[REJECT ALL] [PERMIT ALL]
```

Fig.19

| SHARED FILE MANAGEMENT SYSTEM | ☒ |

ANOTHER USER REQUESTS ASSIGNMENT OF EDITING RIGHT TO FOLLOWING PORTIONS. SELECT REJECTION OR PERMISSION. IN CASE OF REJECTION, YOU CAN NOTIFY THE REASON OF REJECTION.

START POINT 1: PAGE 7   LINE 12   PLACE 8

END POINT 1: PAGE 13   LINE 2   PLACE 26   [REJECT] [PERMIT]

START POINT 2: PAGE 24   LINE 10   PLACE 1

END POINT 2: PAGE 28   LINE 24   PLACE 38   [REJECT] [PERMIT]

[REJECT ALL] [PERMIT ALL]

Fig.20

| SHARED FILE MANAGEMENT SYSTEM | ☒ |

ANOTHER USER REQUESTS ASSIGNMENT OF EDITING RIGHT TO FOLLOWING PORTIONS. SELECT REJECTION OR PERMISSION. IN CASE OF REJECTION, YOU CAN NOTIFY THE REASON OF REJECTION.

START POINT 1: PAGE 7   LINE 12   PLACE 8

END POINT 1: PAGE 13   LINE 2   PLACE 26   [REJECT] [PERMIT]

START POINT 2: PAGE 24   LINE 10   PLACE 1

END POINT 2: PAGE 28   LINE 24   PLACE 38   [REJECT] [PERMIT]

[REJECT ALL] [PERMIT ALL]

SYSTEM AND SERVER FOR MANAGING SHARED FILES

This application is based on patent application No. 2004-189622 filed in Japan, the contents of which are hereby incorporated by reference.

BACKGROUND OF THE INVENTION

1. Field of the Invention

The present invention relates to a system for managing files shared in a network.

2. Description of Prior Art

In many systems for managing files shared by a plurality of users in a network, when a user edits a shared file, other users can open the file for read-only or they cannot edit it. This processing is used to prevent inconsistency in information from occurring when a same portion in the file is edited at the same time. For example, if data contents that was stored previously by a user is overwritten with data contents stored thereafter by a different user, the former data contents is lost for the previous user. Also, many systems for managing shared files do not allow a file to be edited at the same time even for different portions in the file.

However, if a file is edited at the same time at different portions by a plurality of users, the edited data can be stored by any of the users irrespective of the location of the edited portion, and the above-mentioned problem is avoided. When a file has a smaller size, a probability that a same portion is edited at the same time would be higher. However, as the file size becomes larger, the probability becomes smaller. In addition, the necessity to edit different portions at the same time becomes higher for a file of a larger size. Then, many proposals are proposed for management on editing of shared files.

For example, many techniques are proposed to manage a file for each of partial areas therein. In a system described in Japanese Patent laid open Publication 10-55300/1998, a file is divided into portions, and management means keeps data for each portion in a management table recording access situation and a person who accesses the file portion. When a request for accessing a file is received, it is asked for the person to designate an access portion. If the access portion is not used, the access is permitted, and the management table is updated. Then, the file can be accessed at the same time at different portions, without destroying a file, and it can be referred to or updated. In a system described in Japanese Patent laid open Publication 6-295299/1994 for electronic editing for a document file, a plurality of operators edits the file for each page at the same time. The document file is divided into pages, and a parallel editing flag, a user management table and an access map area are provided for each page. Further, an object table is provided for managing data on an object to be edited for each operator registered in the user management table, and updated data are automatically exchanged between a master file and the data file. Thus, portions to be edited by the operators are assigned preliminarily, so that a danger to edit the same portion can be avoided. A system described in Japanese Patent laid open Publication 6-12310/1994 permits editing only for one person in the unit of partial portion in a file. A table for exclusive control stores exclusive management information for all the partial portions in a file to be edited, while a relational information table stores information that relational information on a partial portion is kept in the same file or in a different file. When an editor apparatus starts editing of a partial portion in a file, it is checked with reference to the exclusion management table whether editing is possible or not, and if the editing is possible, the exclusion management table is updated to show that it is under the exclusion management. Further, with reference to the relational information table, it is checked whether a relational portion to the partial portion is present or not, and if it is present, it is subjected to the exclusive control by updating the exclusion control table. When the editing is completed, the exclusive management table is recovered to the state at the start and the exclusive management is canceled. Thus, a file can be edited at different portions at the same time while keeping consistency of the data in the file, and the consistency can be kept between a partial portion to be changed for editing at the time and other portions not changed.

It was proposed to permit to access data by updating latest information, without minding inhibition control. In a system described in Japanese Patent laid open Publication 5-225028/1993, exclusive control is performed for simultaneous accesses to a file shared by a plurality of users and manages read from and write to the file by the users. It is decided at each predetermined time whether information referred to now is the latest information or not, and if the information is not the latest information, the latest information is read and displayed in a display device. Data which may be changed continuously is locked in order to prevent inconsistency in the data, but unlocked when a certain time elapses after the last time when the data is changed.

However, in the prior art systems for managing files shared in a network, a plurality of users can edit different portions in a file, but the systems cannot be used easily by users. For example, in the simultaneous file editing described in Japanese Patent laid open Publications 10-55300/1998 and 6-12310/1994, the system itself has editing right to the files. Therefore, even when there is no person who is editing a file, a person who wants to access the file has to designate an access portion for the file, and this makes the operation inconvenient. In the system described in Japanese Patent laid open Publications 6-295299/1994, exclusive control is adopted to permit editing for only a person in the unit of partial portion. Then, it cannot be used easily when editing portions for a plurality of editors are not determined preliminarily. In the system described in Japanese Patent laid open Publication 5-225028/1993, the latest information is updated each predetermined time, and this wastes the network resources.

SUMMARY OF THE INVENTION

An object of the invention is to provide a user-friendly file sharing system for permitting editing at different portions in a file at the same time while forbidding editing at a same portion at the same time.

In an aspect of the invention, files shared by a plurality of client apparatuses are managed in a server apparatus connected through a network to the plurality of client apparatuses. When an access to a file in the shared files by a first client apparatus is received, it is decided whether the file accessed is under editing by a second client apparatus or not, with reference to file management data on access circumstance of the shared files. When the accessed file is not edited by any other client apparatus, the first client apparatus is allowed to open the file and is permitted editing of the file by the first client apparatus. On the other hand, when the accessed file is not edited by a second client apparatus, the second client apparatus editing the file including a portion which the first client apparatus intends to edit, a first graphic user interface is presented to the second client apparatus for notifying whether the second apparatus permits or rejects editing of the portion by the first client apparatus. When a notification to permit editing of the portion is received from the second client apparatus, the first client apparatus is allowed to open the file in a status wherein editing of the portion by the first client apparatus is permitted.

An advantage of the present invention is that users can edit a file at different portions at the same time by giving editing right to a user or users by the user having the editing right.

Another advantage of the present invention is that the contents in a file stored previously by a user are not overwritten by contents stored by another user thereafter.

BRIEF DESCRIPTION OF THE DRAWINGS

These and other objects and features of the present invention will become clear from the following description taken in conjunction with the preferred embodiments thereof with reference to the accompanying drawings, and in which:

FIG. 14 is a diagram of a first graphic user interface for designating a portion which a user intends to edit;

FIG. 15 is a diagram of a second graphic user interface for designating a portion which a user intends to edit;

FIG. 19 is a diagram of a sixth third user interface for designating a portion which a user intends to edit;

FIG. 20 is a diagram of a fourth graphic user interface for designating a portion which a user intends to edit;

DETAILED DESCRIPTION OF THE PREFERRED EMBODIMENTS

Figure 1:
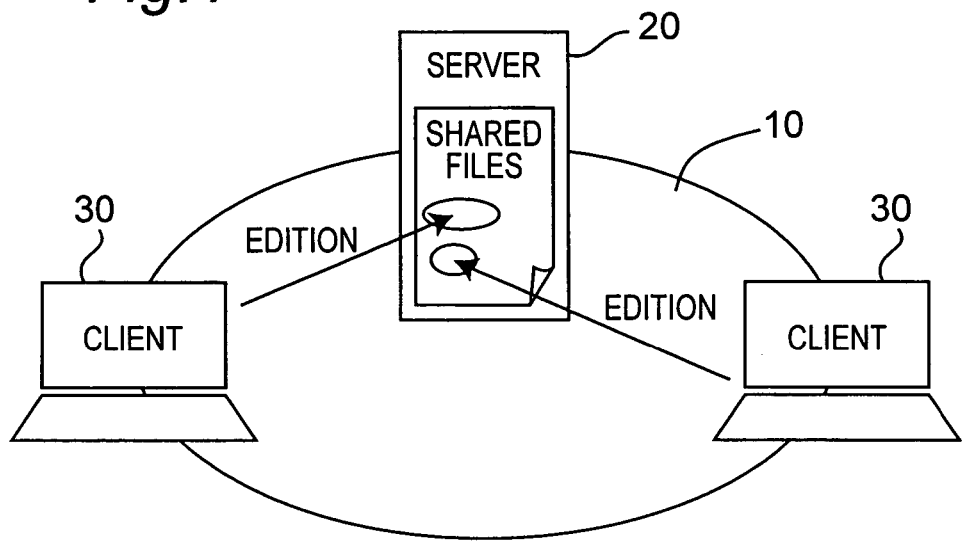
FIG. 1 is diagram of an entire structure of a system for managing shared files.

Referring now to the drawings, wherein like reference characters designate like or corresponding parts throughout the several views, FIG. 1 shows generally a system for sharing files in a network such as a local area network. A server apparatus 20 for storing shared files as well as client apparatuses 30 such as personal computers are connected in the network 10, and the client computers can access to shared files managed by the server apparatus 20. A file management program is installed in the server apparatus 20. A user operates a client apparatus 30 to access and edit the shared file in the server apparatus 20. Though only two client apparatuses are shown in FIG. 2, the number of the client apparatuses is not limited to two.

Figure 2:
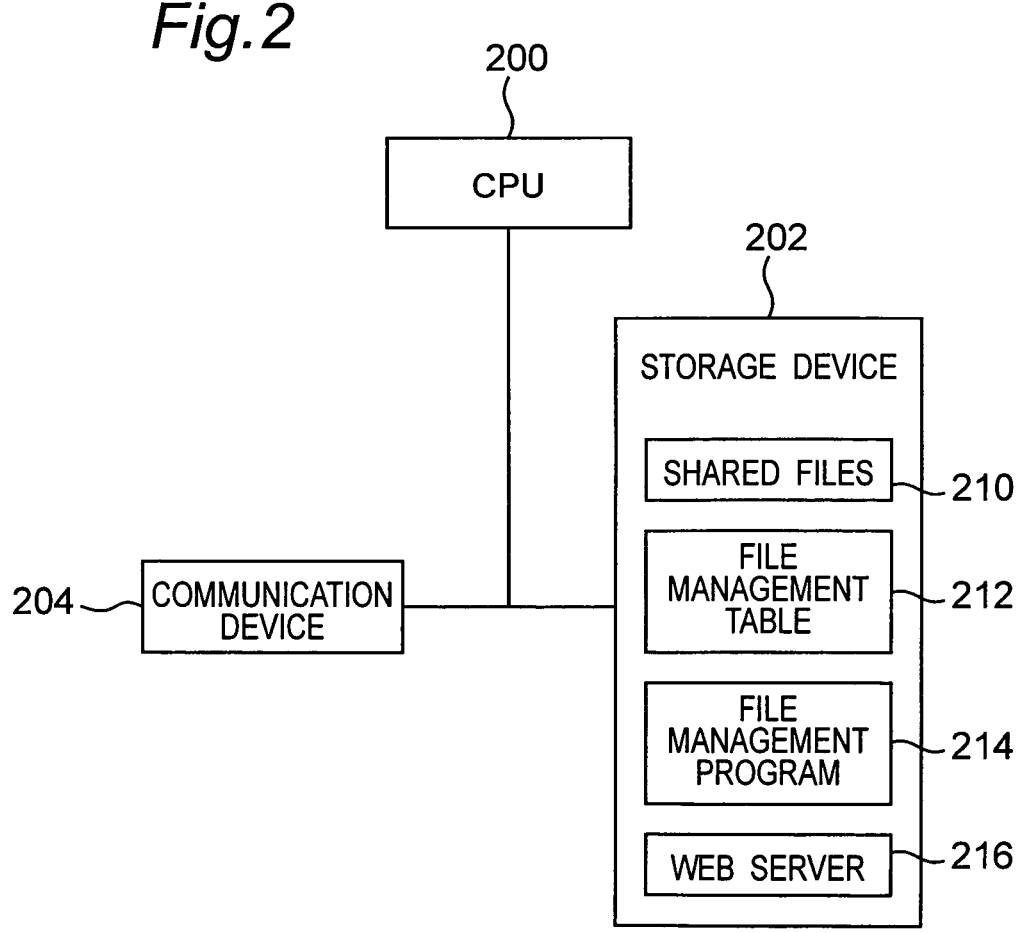
FIG. 2 is a diagram of a server apparatus.

FIG. 2 shows a structure of the server apparatus 20. In the server apparatus 20, a central processing unit (CPU) 200 which controls the entire system is connected to a storage device 202 such as a hard disk drive and to a communication device 204 for transmitting data through the external network 10. The storage devices 202 stores files 210 shared via the network, a file management table 212 on the shared files 210, a file management program 214 for managing the shared files 210, and a web server 216 which enables access to the shared files 210 from the external. The file management table 212 has file management data on access circumstance of the shared files. The web server 216 stores various graphic user interfaces for access to the file management program 214 in order to access a shared file 210.

Figure 3:
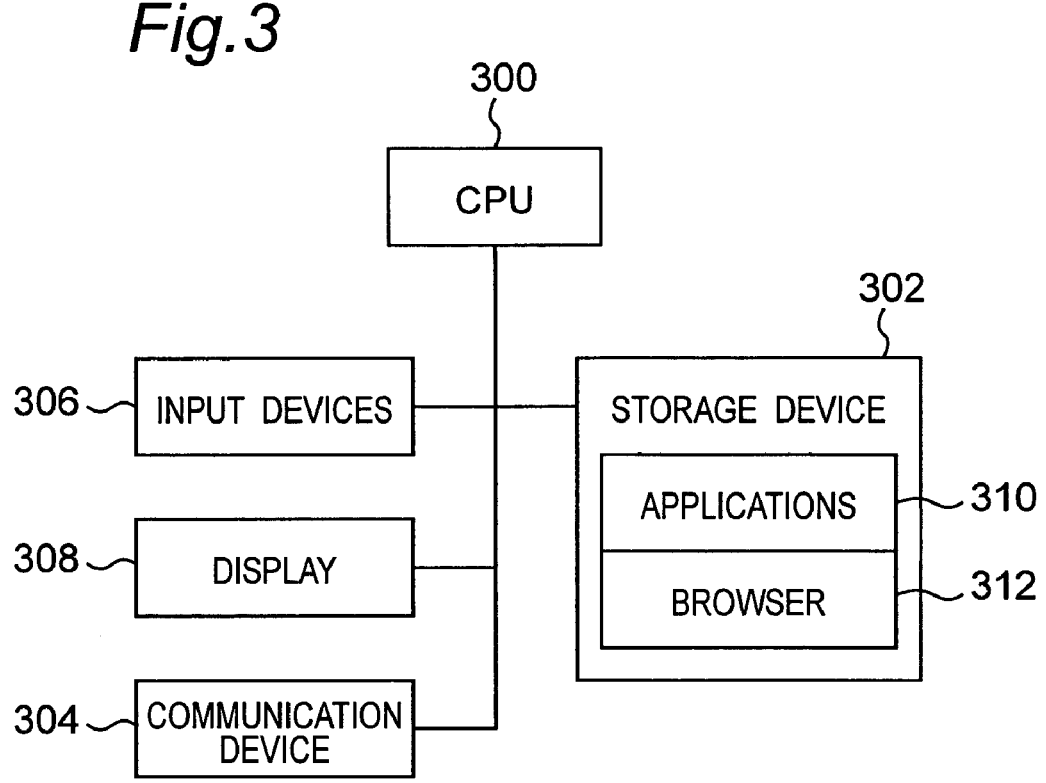
FIG. 3 is a diagram of a client apparatus.

FIG. 3 shows an example of the client apparatus 30. In the client apparatus 30, a central processing unit (CPU) 300 for controlling the entire apparatus is connected to input devices 306 such as a keyboard and a mouse, a display apparatus 308 as a display means, and a storage device 302 such as a hard disk device, a communication device 304 for data transmission through the network, and the like. The storage device stores various applications 310 for processing a shared file and a browser 312 for accessing the server apparatus 20 through the network 10. In this embodiment, the server apparatus 20 communicates with the client apparatus 30 by using the web server 216 and the browser 312, but the communication between them is not limited to this procedure. A user can edit a shared file at any one of the client apparatuses 30 by using the application 310. It is to be noted that "editing" means a work in a general sense including addition, deletion, change and the like for a shared file.

The file management program 214 in the server apparatus 20 permits editing a shared file at different portions in the file at the same time while prohibits editing a same portion at the same time. The file management table 212 provided for managing the shared files stores access situation to each file, and the access situation includes user's name who is accessing the file and editing portion to which the user has editing right. The file management system manages the users having editing rights to the shared files and their editing portions with reference to the file management table 212. As to a file managed in the file management system, a user who accesses the file first can have authority to edit the entire file. Alternatively, the user who accesses the file first may designate a portion in the file which he or she intends to edit or have authority to edit the portion. The authority for editing is referred to as "editing right".

When a request for accessing a file is received, the file management program 214 can permit editing of the file with reference to the file management table 212. When only one user accesses a file, the user can be given the authority to edit the entire file, as mentioned above. When another user wants to access the file to which the above-mentioned user has the editing right, the editing user shall permit or reject editing by the other user. When the editing user permits editing of a different portion by the other user, that is, when the editing user assigns editing right to a portion of the file to the other user a plurality of users can edit different portions in the same file. The table 212 is updated, and it stores the situation of editing right. Because the editing user who has the editing right can change a portion to which the editing right is claimed, a portion which the editing user is editing is not necessarily forbidden to be edited by another user who starts editing later. As to the assignment of editing right by the editing user, various modes are possible, as will be explained later, on the management of the portion to which the editing user has edited already.

In the file management system, the client apparatus 30 communicates with the server 20 through a graphic user interface (GUI) displayed in a screen of the display device 308 in the client apparatus 30, and various inputs are accepted in the graphic user interface. When a user (user "A") accesses a file while another user (user "B") is editing it, in order to permit simultaneous editing of different portions in the file, the system informs user "A" that the file is being edited by user "B" in the screen (GUI) in the display device 308 of the client apparatus 30 of user "B". Further, it recommends user "A" to designate a portion in the file which user "A" intends to edit. When user "A" designates a portion in the GUI, the shared file management system informs user "B" that another user (user "A") wants to edit the portion in the file to which user "B" has editing right, and shows the portion in the screen of the display device 308. Then user "B" having the editing right informs rejection or permission of editing on the portion. When user "B" permits the editing, user "A" has the editing right only to the portion. Otherwise, user "A" cannot edit the file. When user "B" does not give the editing right, the reason therefor can be notified to user "A".

Next, a system for managing shared files according to a first embodiment of the invention is explained. When only one user "B" accesses a file, the user is given authority to edit the entire file. If another user "A" designates a portion in the file which he or she intends to edit, user "B" who is editing currently has authority to permit or reject the editing on the portion. In this embodiment, if the portion has already been edited by user "B", the file management system does not notify to user "B" the confirmation for permission or rejection on the portion edited already and notifies user "A" of rejection directly. If a part of the portion has already been edited by user "B", the file management system interprets the request of user "A" that user "A" wants to edit the portion except the part which has already been edited. This puts priority for the editing work by user "B" who has the editing right.

Figure 4:
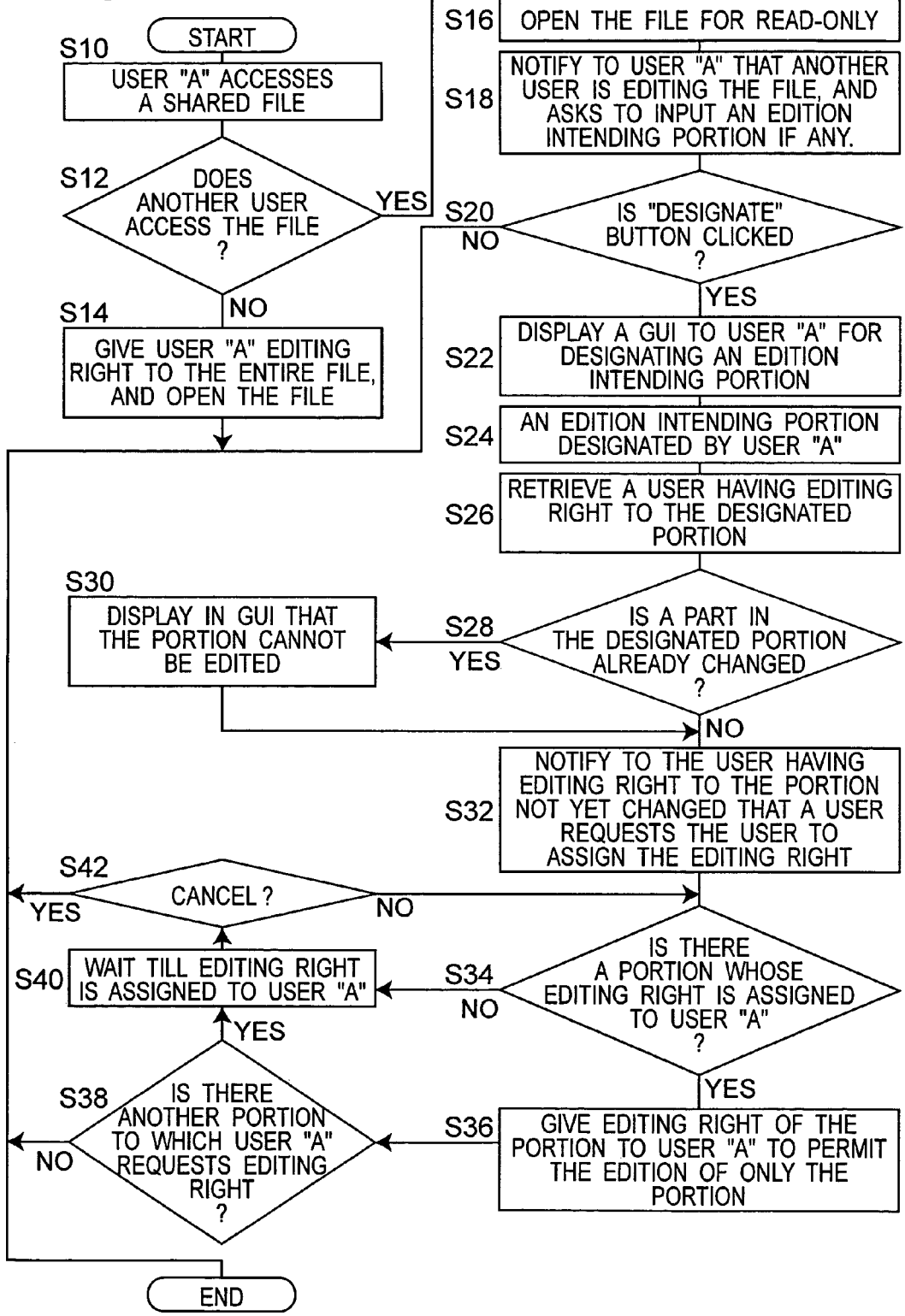
FIG. 4 is a flowchart for managing shared files according to a first embodiment.

FIG. 4 shows a flowchart of a part of a program 214 in the server 20 for managing shared files according to this embodiment, the part being related to the editing right. When a log-in by user "A" at the client apparatus 30 to the file management system is accepted, and access to a shared file is received (S10), it is checked with reference to the file management table 212 whether the file is currently edited by any user or not (S12). If no other user is decided to be editing the file (NO at S12), a right to edit the entire file is given to user "A", who is allowed to open the file (S14). Then, the file management table 212 is updated, and user "A" can edit any portion in the file.

Figure 5:
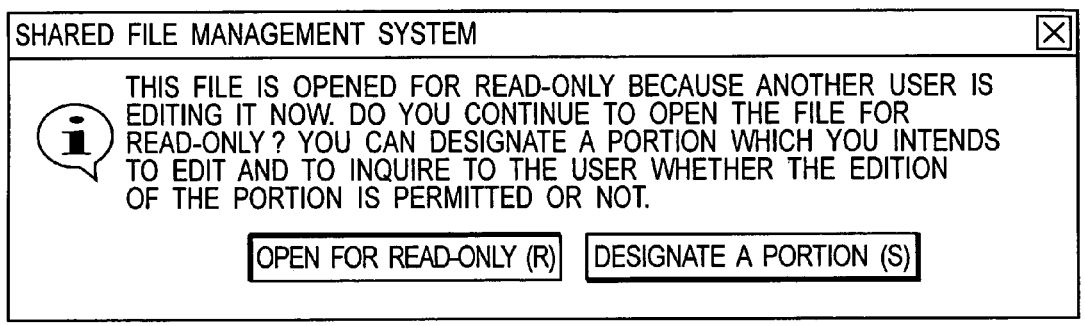
FIG. 5 is a diagram of a graphic user interface for confirming whether a portion which a user intends to edit is present or not.

On the other hand, If another user is decided to be editing the file (YES at S12), it is allowed to open the file for read-only or exclusively for read (S16). Then, it is notified to user "A" that the other user is currently editing the file, in a graphic user interface displayed in the screen of the display device 308 of the client apparatus of user "A". At the same time, it is informed to user "A" that if a portion which user "A" intends to edit is designated, it is inquired to the currently editing user that the portion may be edited or not by user "A" (S18). FIG. 5 shows a dialog for inquiring whether user "A" has a portion in the file which user "A" intends to edit or not. A message is displayed in the dialog as follows: "This file is opened for read-only because another user is editing it now. Do you continue to open the file for read-only? You can designate a portion which you intends to edit and can inquire to the editing user whether the editing of the portion is permitted or not." User "A" can select to press either "Open for read-only" button or "Designate a portion" button. FIG. 5 shows a situation when "Open for read-only" button is clicked.

If it is decided that "Open for read-only" button is clicked by user "A" (NO at S20), the file is opened for read-only. On the other hand, if it is decided that "Designate a portion" button is clicked by user "A" (YES at S20), a graphic user interface (FIG. 6) for designating a portion which user "A" intends to edit (referred to also as "editing intending portion") is shown in the screen of the display device 308 of user "A" (S22). User "A" can designates one or more editing intending portions, in the graphic user interface (S24, refer to FIGS. 7 to 11), as will be explained in detail later.

Figure 6:
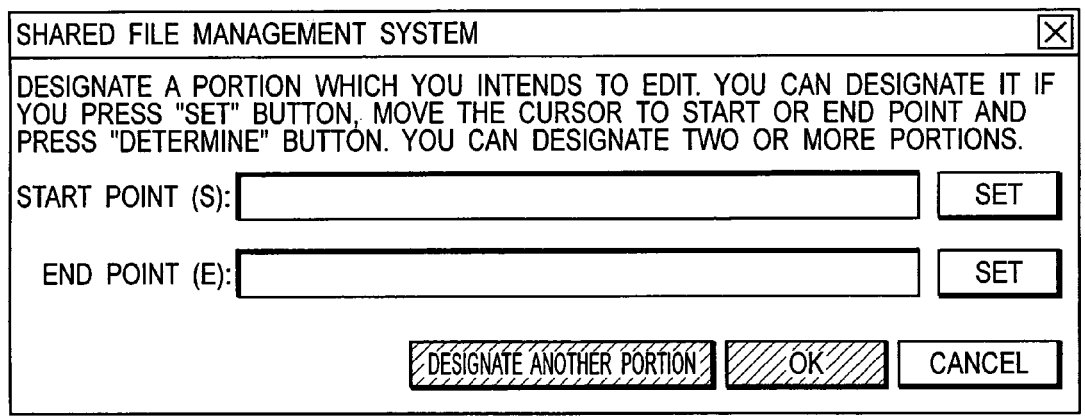
FIG. 6 is a diagram of a first graphic user interface for designating a portion which a user intends to edit.
Figure 7:
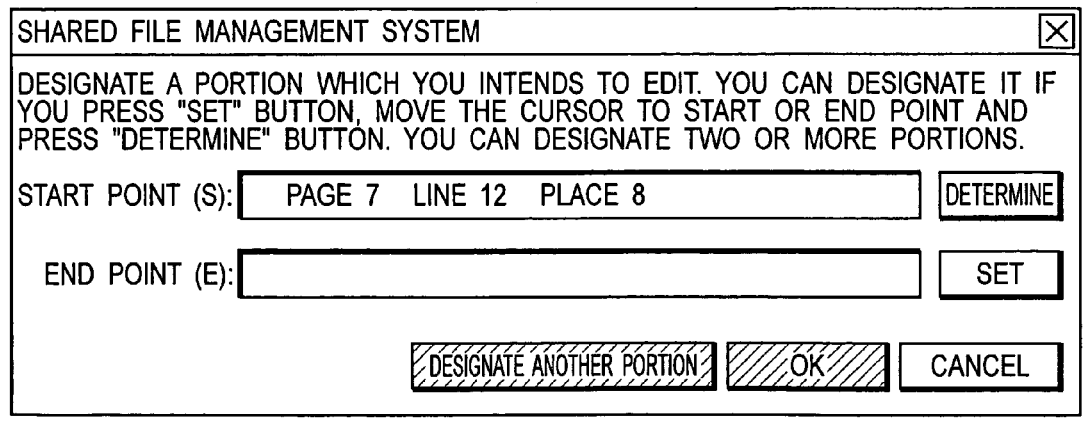
FIG. 7 is a diagram of a second graphic user interface for designating a portion which a user intends to edit.
Figure 8:
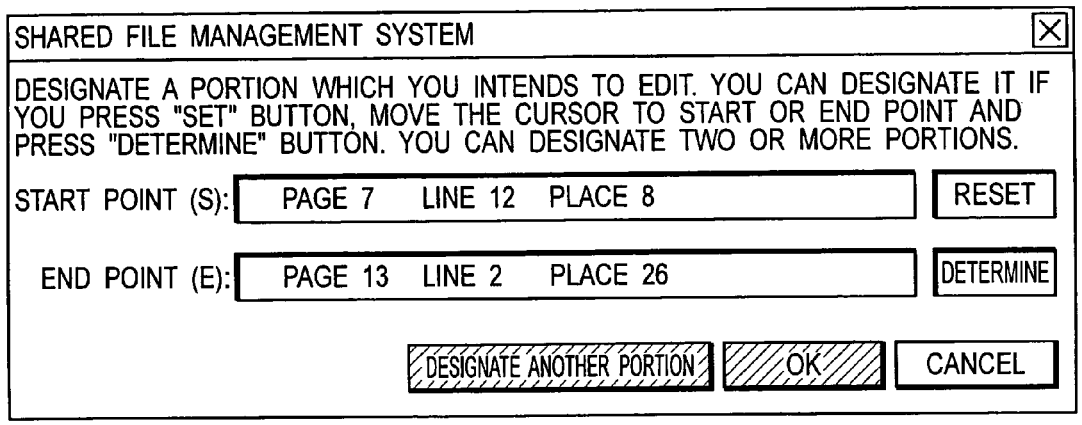
FIG. 8 is a diagram of a third graphic user interface for designating a portion which a user intends to edit.

FIG. 6 shows a graphic user interface for designating an editing intending portion when the "Designate a portion" button is pressed in the graphic user interface shown in FIG. 5. In FIG. 6, a following message is shown: "Designate a portion which you intend to edit. You can designate it if you press "Set" button, move the cursor to start or end point and press "Determine" button. You can designate two or more portions." (It is to be noted that "Designate another portion" button and "OK" button are set to inactive state in FIG. 6.) When "Set" button at the right side of "Start point" text box is pressed, a window for displaying a file becomes active, and as shown in FIG. 7, information on the cursor position in the window is displayed, in the format of "page xx, line yy, place zz" in the text box. Further, the caption of "Set" button is changed to "Determine". When the cursor is moved to a start position and "Determine" button is pressed, as shown in a dialog shown in FIG. 8, the text box is changed to a status wherein the text box cannot be edited. (Though not shown, when "Determine" button is pressed, the color of the text box is changed, and a user can decide easily whether the input data is determined or not.) The caption of "Determine" button is changed to "Reset", and if "Reset" button is pressed, the graphic user interface is returned to the state shown in FIG. 7. Direct input to the text box is also possible with the keyboard. If the point information on start point is known, start position information can be inputted with the keyboard, without moving the cursor in the window wherein the file is displayed. At this time, if page is not set in the text box, "page 1" is set automatically, if line is not set, "line 1" is set automatically, and if place is not set, "place 1" is set automatically.

Similarly, an end point can be designated. An error occurs if an end point precedent before the start point is designated. Alternatively, the cursor is inhibited to move ahead of the start point. If an end point is designated properly, as shown in a dialog in FIG. 9, "OK" button becomes active.

Figure 9:
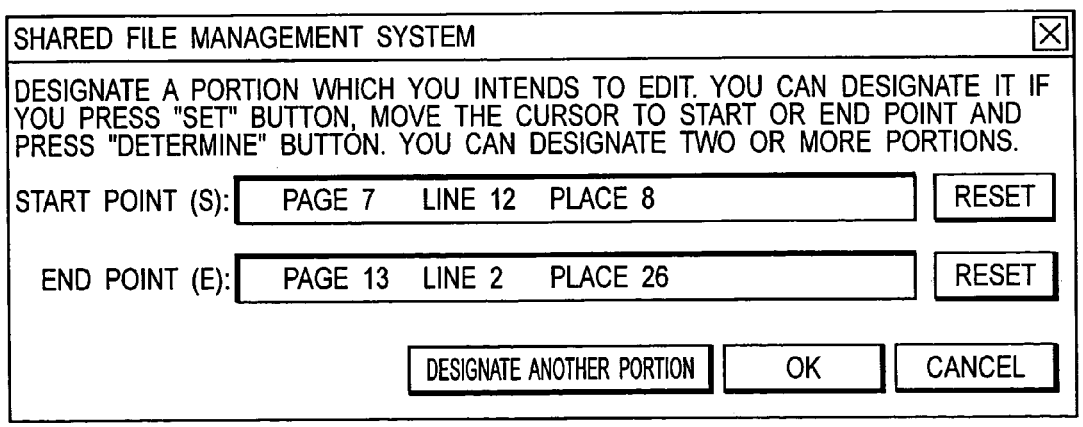
FIG. 9 is a diagram of a fourth graphic user interface for designating a portion which a user intends to edit.
Figure 10:
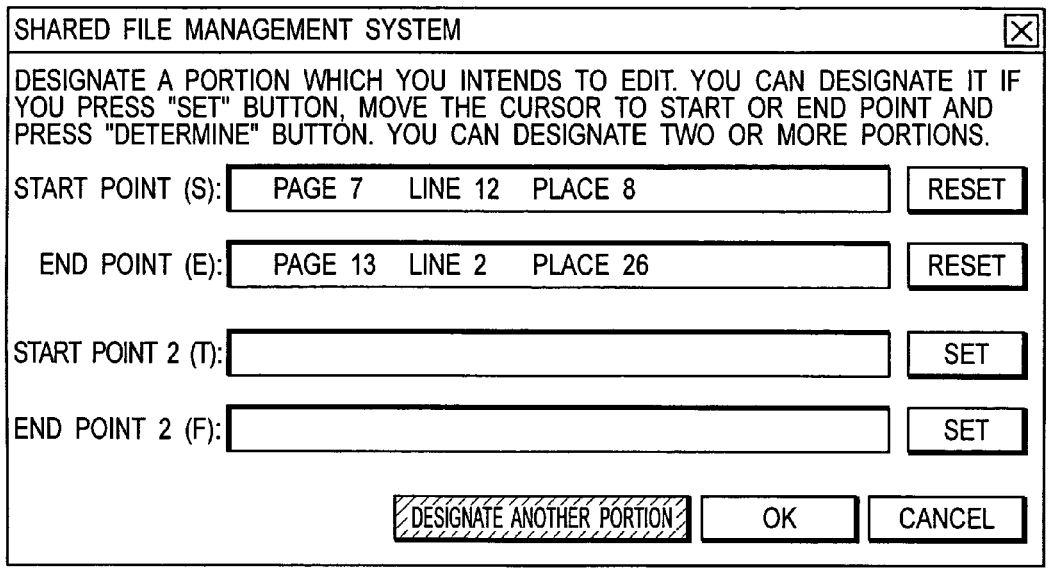
FIG. 10 is a diagram of a fifth graphic user interface for designating a portion which a user intends to edit.
Figure 11:
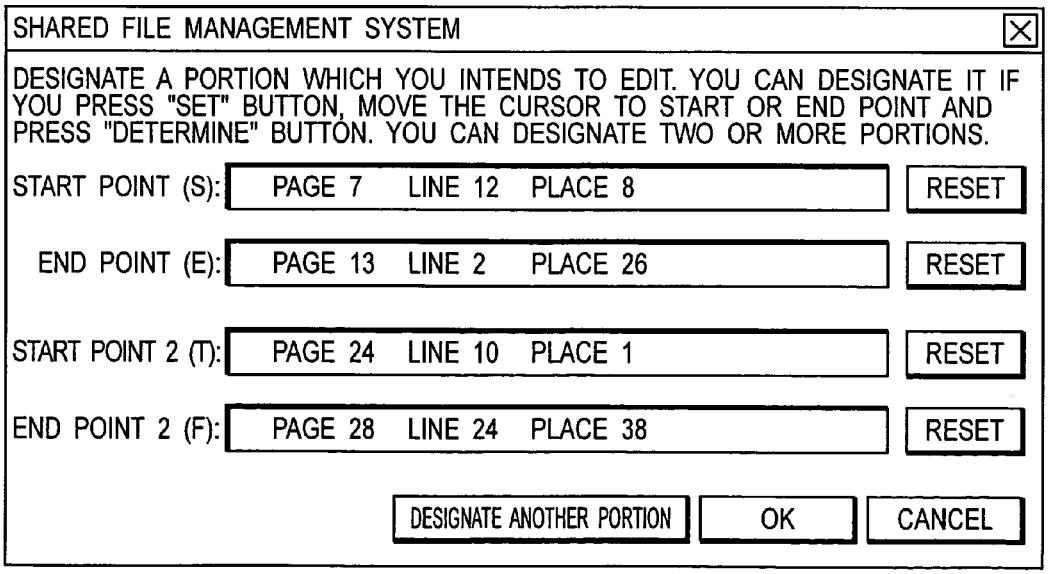
FIG. 11 is a diagram of a sixth graphic user interface for designating a portion which a user intends to edit.

In the dialog shown in FIG. 9, "Designate another portion" button also becomes active, and if another portion is intended to designate, this button is clicked. Then, as shown in FIG. 10, the dialog is extended downward so as to make it possible to designate another portion. Then, text boxes for setting start point 2 and end point 2 are displayed. (In this graphic user interface, "Designate another portion" button becomes inactive.) FIG. 11 shows the dialog wherein the two portions have been designated.

Figure 12:
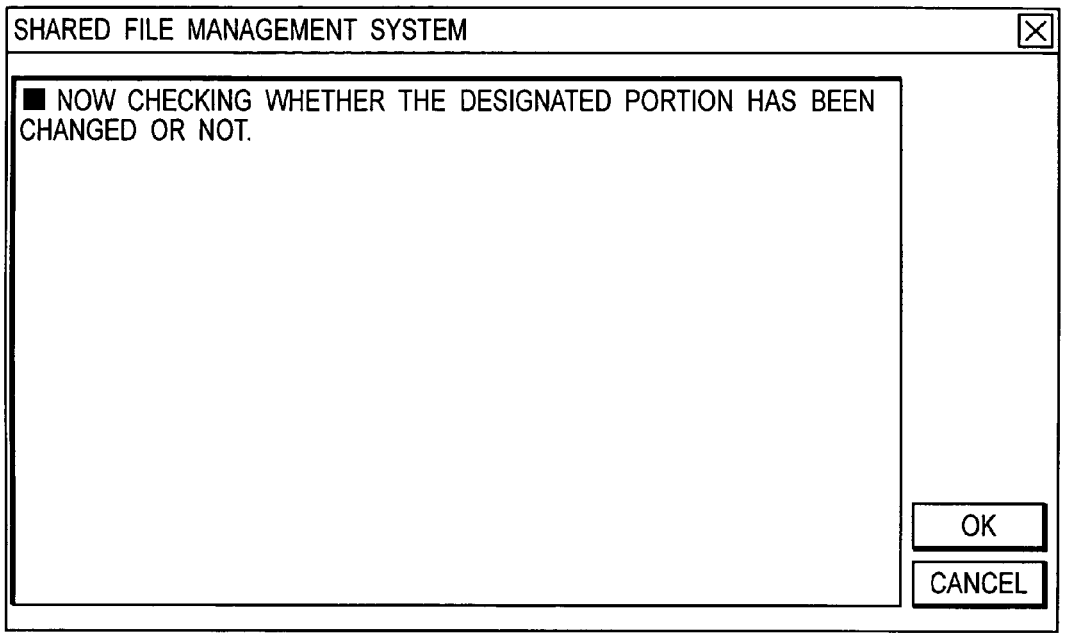
FIG. 12 is a diagram of a communication log window.
Figure 13:
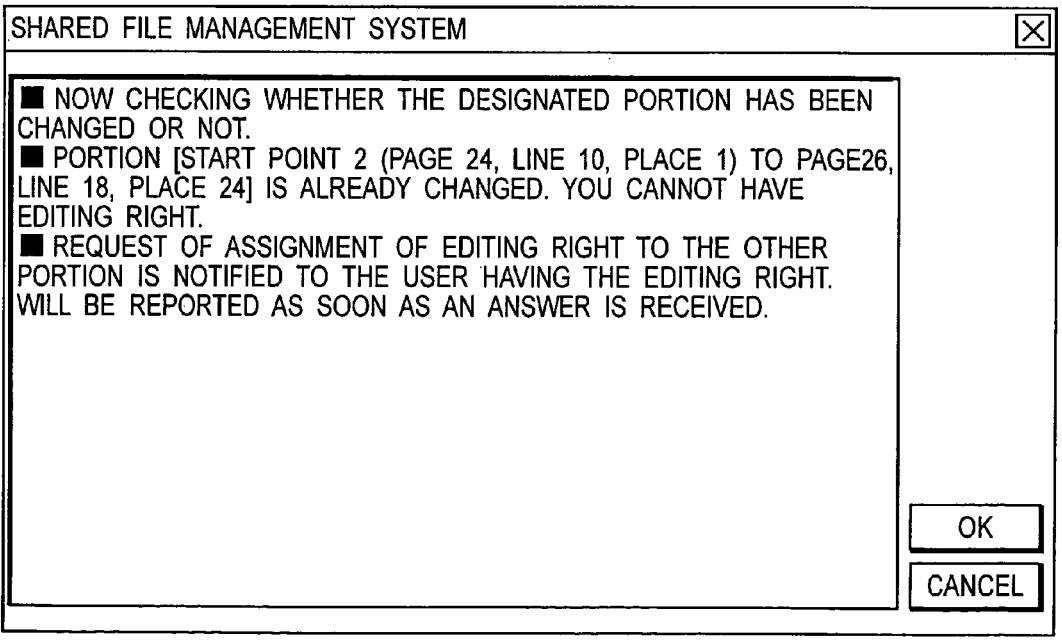
FIG. 13 is a diagram of a communication log window.

When the editing intending portion designated by user "A" is received, it is retrieved in the file management table who has the editing right for the portion (S26, refer to FIG. 12). If the portion has already been changed or edited (YES at S28), it is displayed in the screen (FIG. 13) of the display device 308 of user "A" that the portion cannot be edited (S30).

If "OK" button is pressed in a situation, as in a dialog shown in FIG. 11, wherein one or more editing intending portions are designated, a window of communication log as shown in FIG. 12 is displayed in the screen. In the window, information on a designated editing intending portion is displayed. The shared file management system shall not permit assignment of editing right on a portion to which data have already been changed. Thus, a following message is displayed: "Now checking whether the designated portion has been changed or not", and it is checked whether the designated portion has been changed or not. Then, if the designated portion is decided that it has been changed, it is notified, as shown in the window in FIG. 13, that editing right to the designated portion cannot be obtained. After the check is completed, if there is any other designated portion, a user having the other editing right on the portion is retrieved. Then, the editing intending portion to which assignment of editing right to a different user is requested is notified to the user who has the editing right to the editing intending portion, as shown in a dialog shown in FIG. 14. If a part of the portion has already been changed, the part is automatically removed from the editing intending portion. In an example shown in FIG. 11, start point 2 is denoted as "page 14, line 20, place 1", but in the communication log dialog shown in FIG. 14, it is notified that a part from page 24, line 20, place 1 to page 26, line 18, place 24 has already been edited, and new start point 2 is displayed in the window as "page 26, line 18, place 25".

As to a portion not yet changed, it is notified to user "B" having editing right to the portion in the screen of the display device 308 that he or she is requested to assign the editing right on the portion to another user (S32, refer to FIGS. 14 to 17). Further, as shown in the dialog shown in FIG. 14, a message is displayed for the user having the editing right, as follows. "A user requests you to assign editing right to a following portion(s). Please select rejection or permission for the portion(s). In the case of rejection, a reason of rejection can be sent." User "A" cannot edit the file until rejection or permission is selected for the portion(s). That is, it is waited that a communication is received from the user having the editing right (NO at S34, and S40). The dialog shown in FIG. 14 is closed when either "Reject" or "Permit" button is selected for all the portions.

Figure 16:
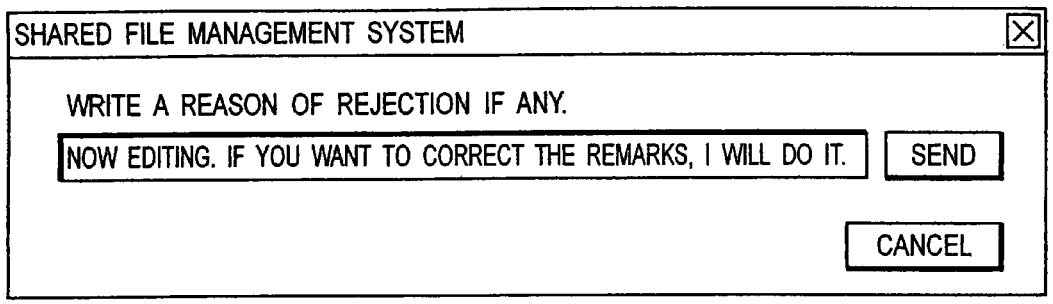
FIG. 16 is a diagram of a graphic user interface for describing a reason for rejecting to assign editing right.
Figure 17:
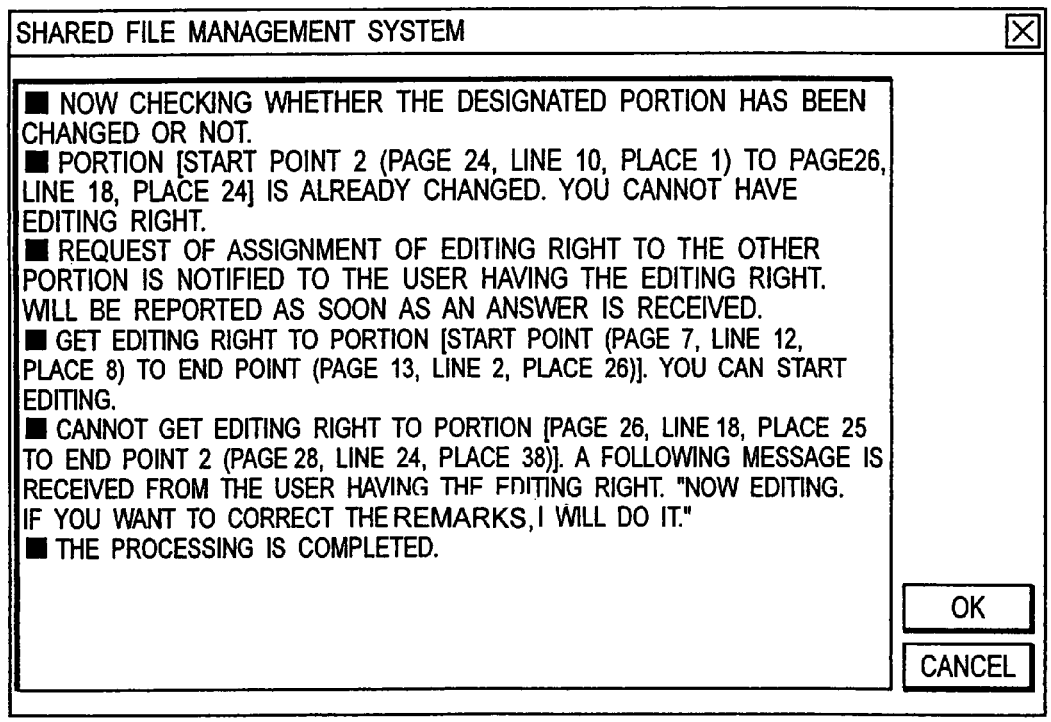
FIG. 17 is a diagram of a communication log window.

For example, as shown in FIG. 15, it is assumed that the first portion from start point 1 to end point 1 is permitted while the second portion from start point 2 to end point 2 is rejected. Then, as to the rejected portion, a dialog as shown in FIG. 16 is displayed for writing a reason for rejecting assignment of the editing right, and user "B" can write and send a reason of rejection. Alternatively, "Reject" button can be pressed, without sending a reason of rejection. Thereafter, as shown in a communication dialog in FIG. 17, the above-mentioned information is notified to user "A" who designates the portions.

When the editing right is assigned to the editing intending portion (YES at S34), the editing right to the portion is given to user "A" (S36), and the file can be opened in a status where editing is permitted only for the portion. Then user "A" can edit the portion. Thus, the file management table 212 is updated. As to the portion to which the editing right is not assigned, a status of open for read-only is maintained, and editing is not possible.

If there is another portion to which user "A" requests to edit (YES at S38), it is waited that the editing right to the portion is assigned to user "A" (S40). IF the request of assignment from user "A" is not canceled (NO at S42), the flow returns to step S34 and the assignment is waited. If the request is canceled (YES at S42), the flow is completed.

In the above-mentioned embodiment, when a user accesses a shared file while another user is editing the file, a graphic user interface for designating an editing intending portion is displayed. Alternatively, when a file is accessed, an editing intending portion for editing data may be designated at the same time.

Next, a system for managing shared files according to a second embodiment of the invention is explained. The second embodiment is similar to the first embodiment in many points, but it makes it possible for user "A" who accesses a file later to edit a portion in the file even if another user has already changed the portion or a part thereof. That is, in the second embodiment, even if a portion or a part thereof requested for editing has been changed by another user "A" confirmation is notified to the user and waits an answer therefor. This takes into account that the user may assign the editing right, for example, when he or she has already completed editing on the portion.

Figure 18:
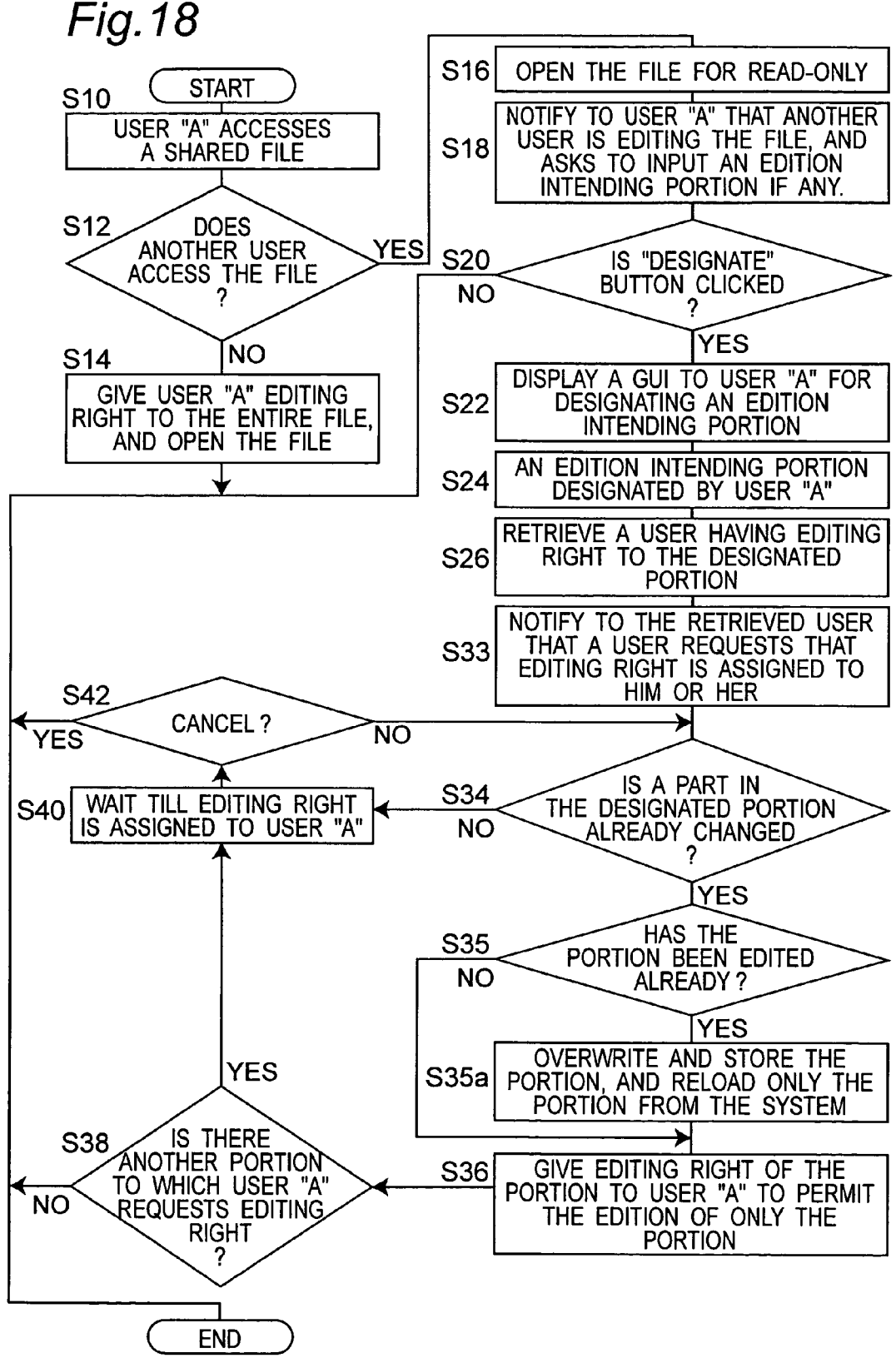
FIG. 18 is a flowchart for managing shared files according to a second embodiment.

FIG. 18 shows a flowchart of a program for managing shared files according to the second embodiment. In the following, only different points from the file management program in the first embodiment are explained. When user "A" designates one or more editing intending portions in a graphic user interface for designating portions, a user who has editing right to the portions is retrieved at step S26. The processing from start to step S26 is the same as the counterpart in the first embodiment. Then, in the first embodiment, if data in a designated portion has been changed by another user, user "A" cannot obtain editing right to the portion, without requesting assignment of editing right of the another user. On the other hand, in the second embodiment, it is notified or asked to the retrieved user that another user requests that editing right is assigned (S33). If a portion to which editing right is assigned to user "A" is not included in the designated portions (NO at S34), it is waited that editing right is assigned to user "A" (S40), similarly to the first embodiment. On the other hand, if a portion to which editing right is assigned to user "A" is included (YES at S34), the portion is overwritten for storage, and user "A" reloads only the portion in the file or the entire file from the system (S35a). Then, the editing right of the portion is given to user "A" to permit editing only for the portion (S36). Then, the file management table 212 is updated. Thus, user "A" starts to edit the portion after it is updated, and this prevents inconsistency of the information on the file. The processing thereafter is similar to the program of the first embodiment, and explanation thereof is omitted here.

Figure 21:
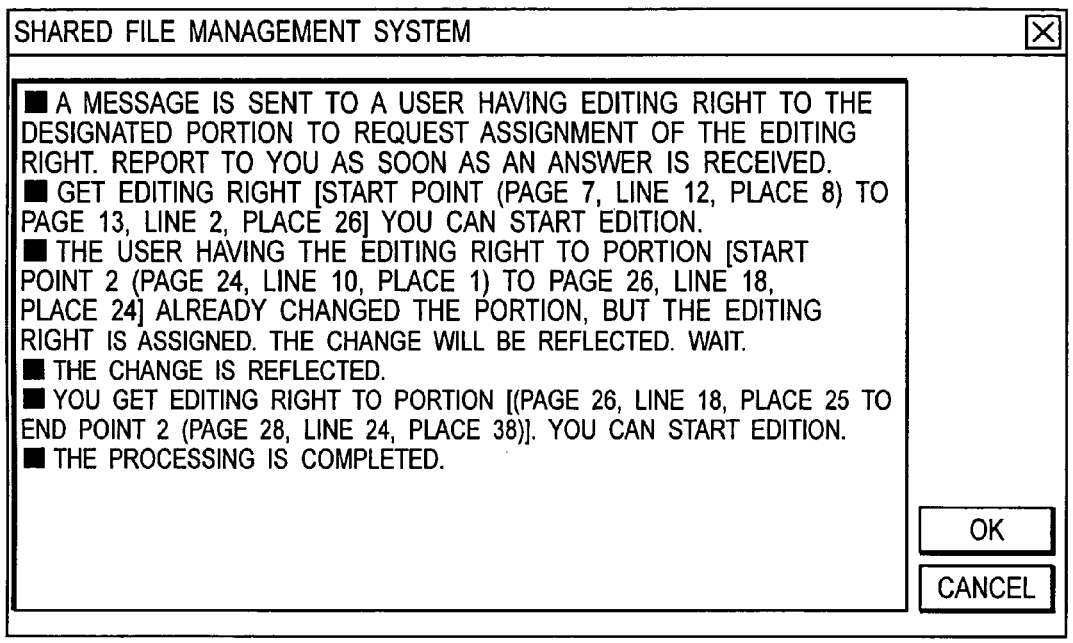
FIG. 21 is a diagram of a communication log window.

A graphic user interface for designating an editing intending portion in this embodiment is explained, in contrast to the first embodiment, in a situation when another user who starts editing of a file first already edits a part of an editing intending portion designated by user "A" who accesses the file later. The flow of operation and display shown in FIGS. 6 to 12 is similar to the counterpart in the first embodiment. After the shared file management system detects a portion which has already been edited, a dialog shown in FIG. 19 is presented to the other user "B". It is different from the dialog of FIG. 14 in the first embodiment that the contents of start point 2 is displayed as requested by user "A", irrespective of whether user "B" edits the relevant portion or not. If user "B" clicks "Permit" button for the both portions, as shown in FIG. 20, and notifies the assignment of editing right, it is already recognized that start point 2 of the second editing intending portion has been edited (page 24, line 10, place 1 to page 26, line 18, place 24), so that the portion is overwritten and stored, and user "A" reloads the portion. Thus, the file opened by the user "B" having the editing right is updated to keep the latest state. Further a message is shown for user "A" in a communication log window shown in FIG. 21 to show what the system is doing. In this example, a following message is displayed. "The user having editing right to a portion (start point 1 of page 24, line 10, place 1 to page 26, line 18, place 24) has already changed the portion, but the editing right is assigned. Wait until the change is reflected."

Next, a system for managing shared files according to a third embodiment of the invention is explained. This embodiment is similar to the first and second embodiments in many points, and only different points are explained below. In the third embodiment, it is possible to assign editing right only to a part of a portion to which user "A" intends to edit, without assigning the other part of the portion. That is, a user who is editing a file can assign the editing right only to a part of an editing intending portion in the file. It is different from the second embodiment that editing right can be given partially to the editing intending portion in the processing at step S36 in the flowchart of the file management program of FIG. 18.

Figure 22:
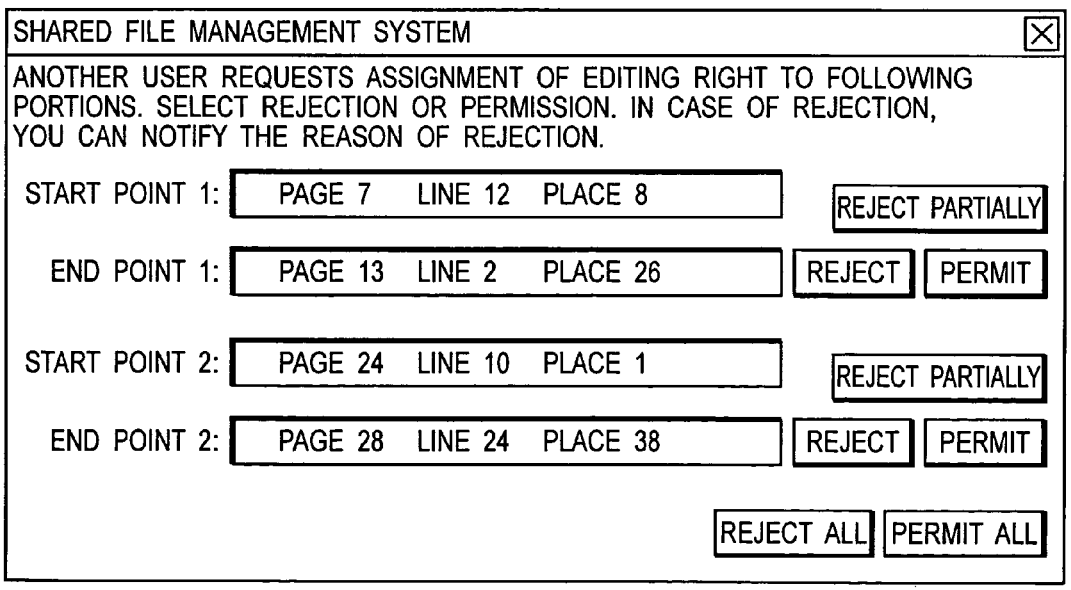
FIG. 22 is a diagram of a fifth graphic user interface for designating a portion which a user intends to edit.

FIG. 22 shows a communication log dialog displayed in the display device of the other user who starts editing of the file first and has editing right for the file when user "A" who starts editing later requests assignment of editing right. The dialog has "Reject partially" button as well as "Reject" button, "Permit" button, "Reject all" button and "Permit all" button. "Reject partially" button is used for rejecting editing for only a part of the editing intending portion.

Figure 23:
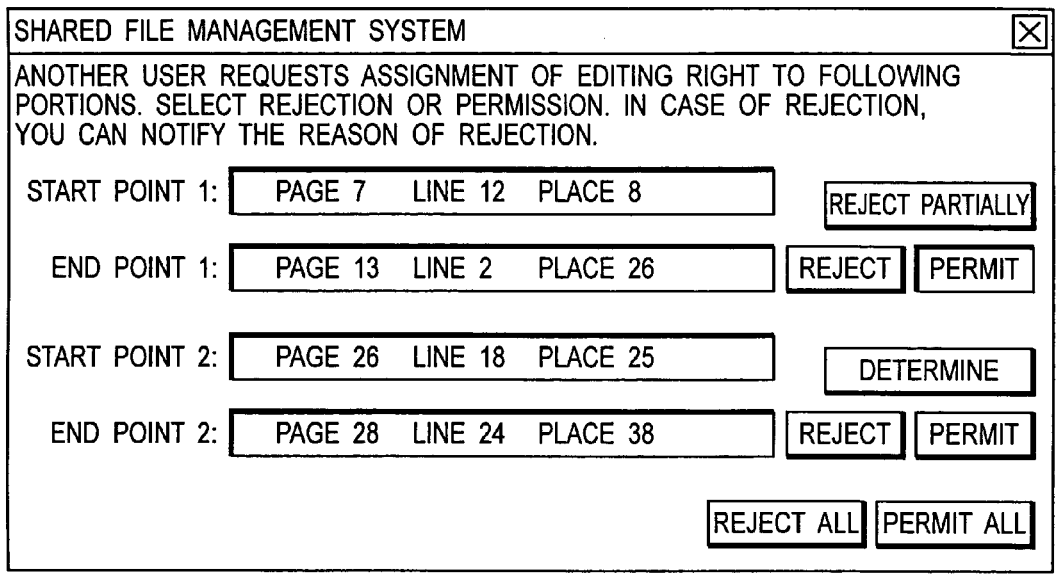
FIG. 23 is a diagram of a sixth graphic user interface for designating a portion which a user intends to edit.
Figure 24:
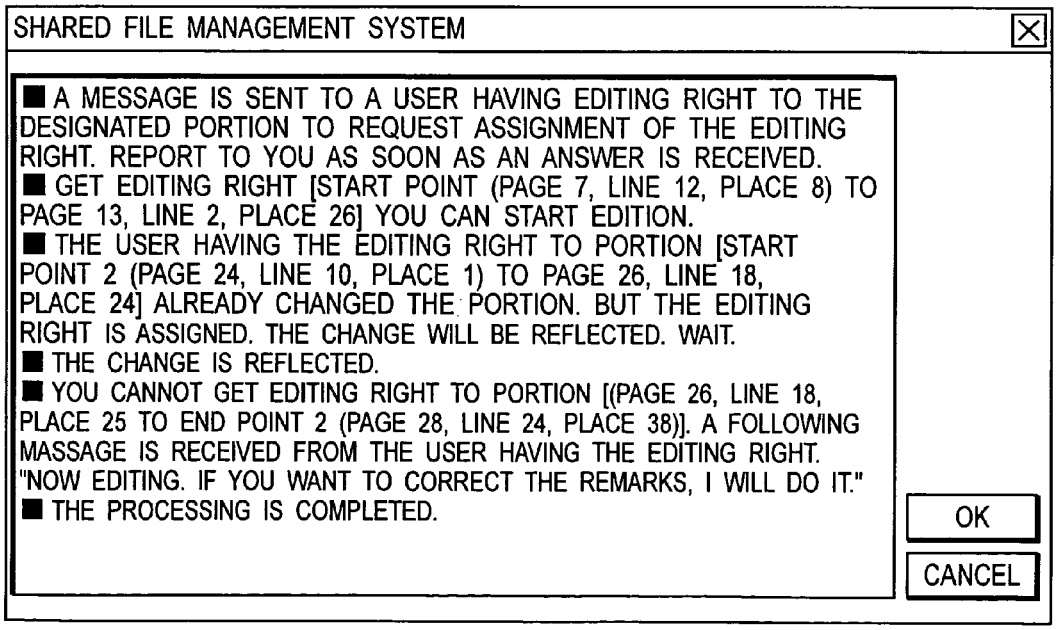
FIG. 24 is a diagram of a communication log window.

It is assumed here that the other user is editing page 26, line 18, place 24 and that the editing to this point has been completed, but the other user will edit a part following thereafter so that will not assign editing right. IF "Reject partially" button in the dialog is clicked, editing in the text box is enabled, and a part on which editing shall be rejected can be designated. Further, the caption of "Reject partially" button is changed to "Determine" as illustrated in FIG. 23. When a cursor is positioned in a window displaying the file at a designated point, the position information of the cursor is presented in the text box. Off course, it may be inputted directly with the keyboard. The remaining part other than the part designated after pressing "Reject partially" button is dealt as a part whose editor right can be permitted. When "Reject" button, "Permit" button or "Determine" button is pressed for all the portions, the dialog is closed. When a rejected part is present, it may be possible to open the dialog shown in FIG. 16 to write a reason of rejection. If it is assumed here that the same reason as shown in FIG. 16 is inputted, a communication dialog as shown in FIG. 24 is displayed for the other user as to the partial rejection, a following message is displayed for example. "Editing right of portion (page 26, line 18, place 25 to end point 2 (page 28, line 24, place 38)) cannot be obtained. A following message is received from the user having the editing right to the portion. "I am editing the part now. If you want to correct the remarks, I will do it."

Next, a system for managing shared files according to a fourth embodiment of the invention is explained. In the above-mentioned embodiments, when a first user accesses a file, if no user is editing the file, the editing right to the entire file is given to the first user. However, if it is already known that a file is edited by a plurality of users, especially if editing portions have already been assigned, it is always necessary to give editing right to a user who accesses the file after the first user. Thus, the burden of the first user would be heavy. In order to avoid this problem, in this embodiment, the first user who accesses a shared file first can designate a predetermined editing portion when opening the file. Therefore, if a second or following user does not designate the editing portion to be edited by the first user, the first user is not needed to operate to assign the editing right, so that the burden of the first user can be decreased.

Figure 25:
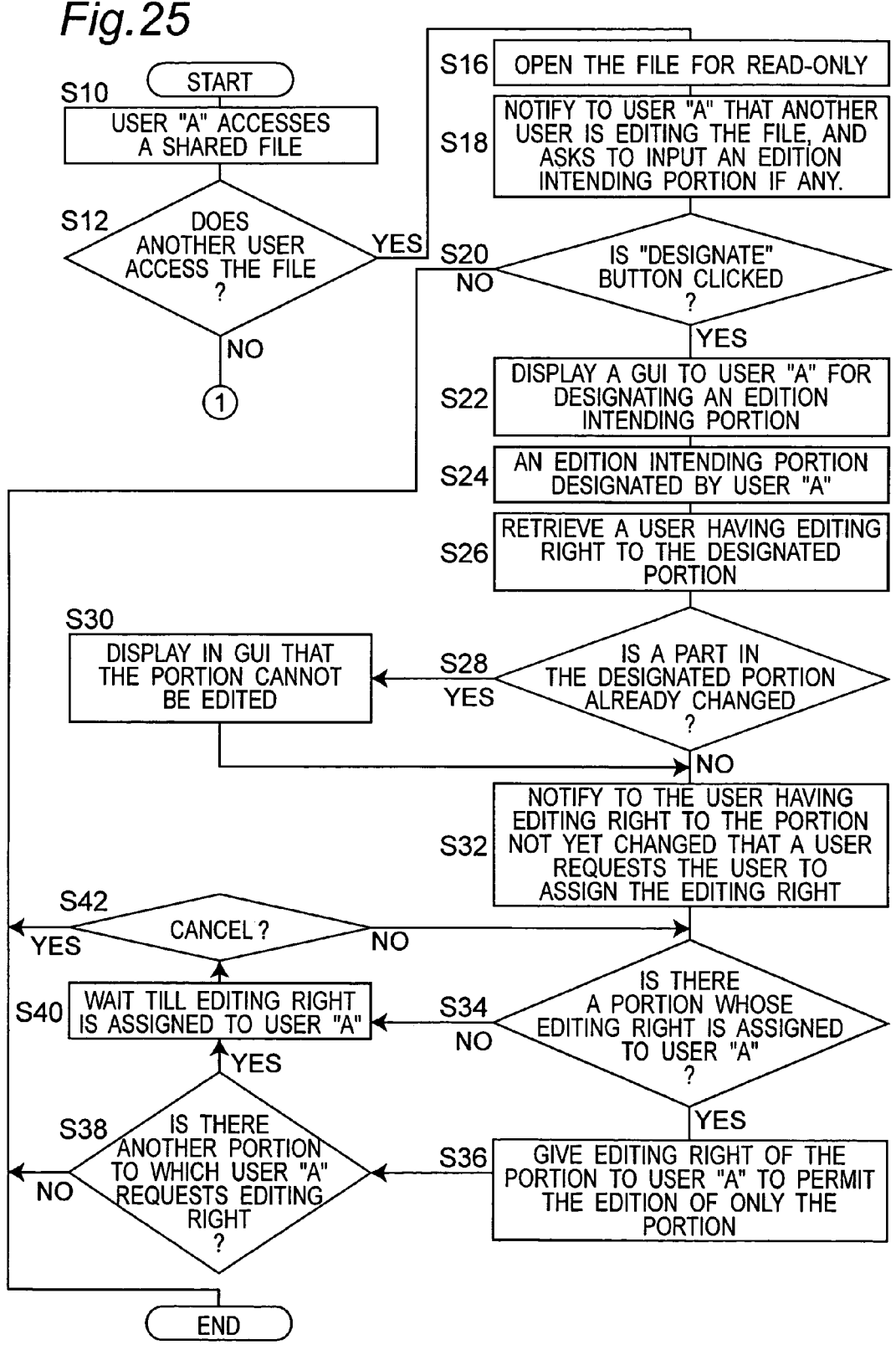
FIG. 25 is a part of a flowchart for managing shared files according to a fourth embodiment.
Figure 26:
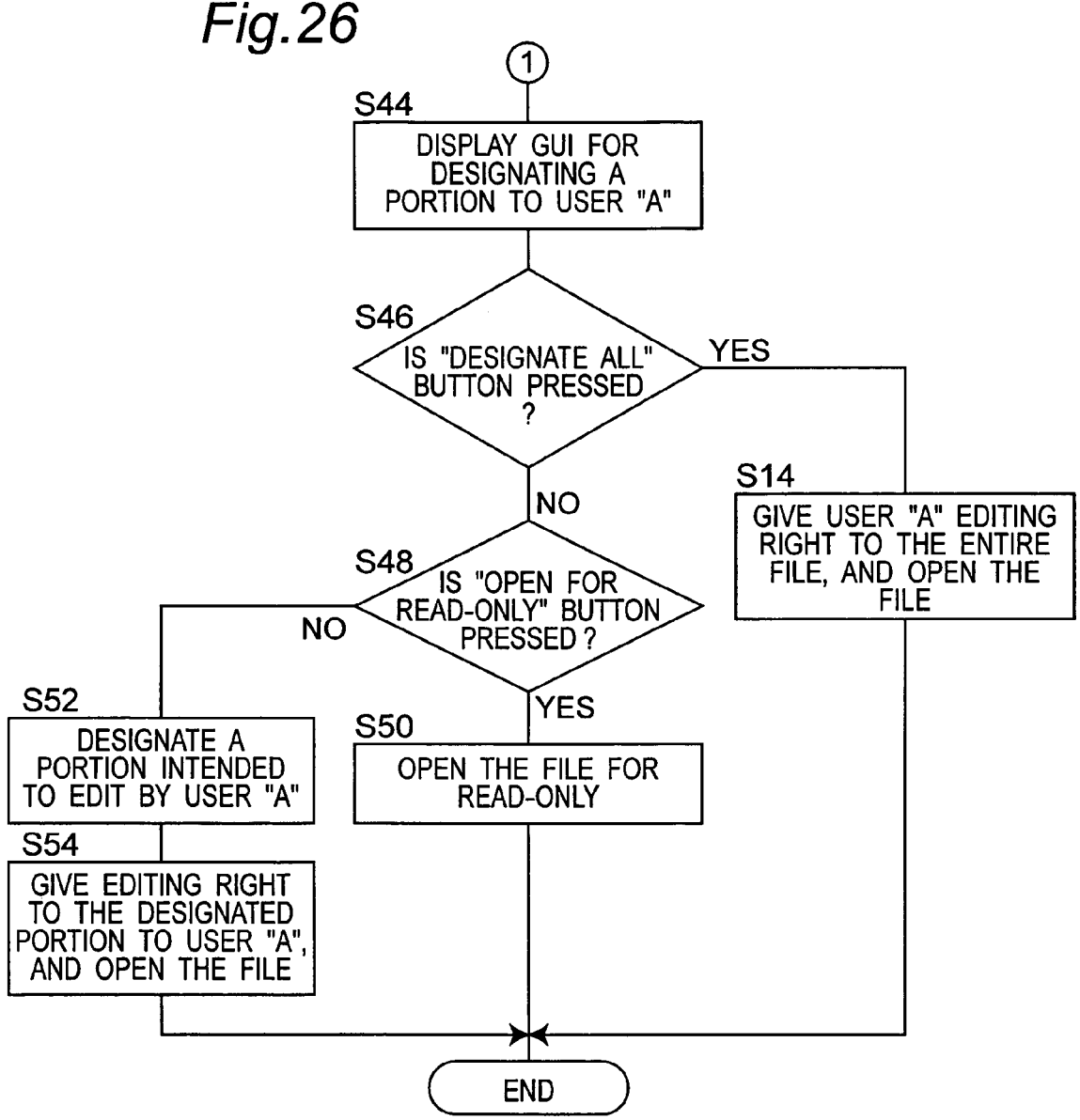
FIG. 26 is the other part of the flowchart for managing shared files according to a fourth embodiment.
Figure 27:
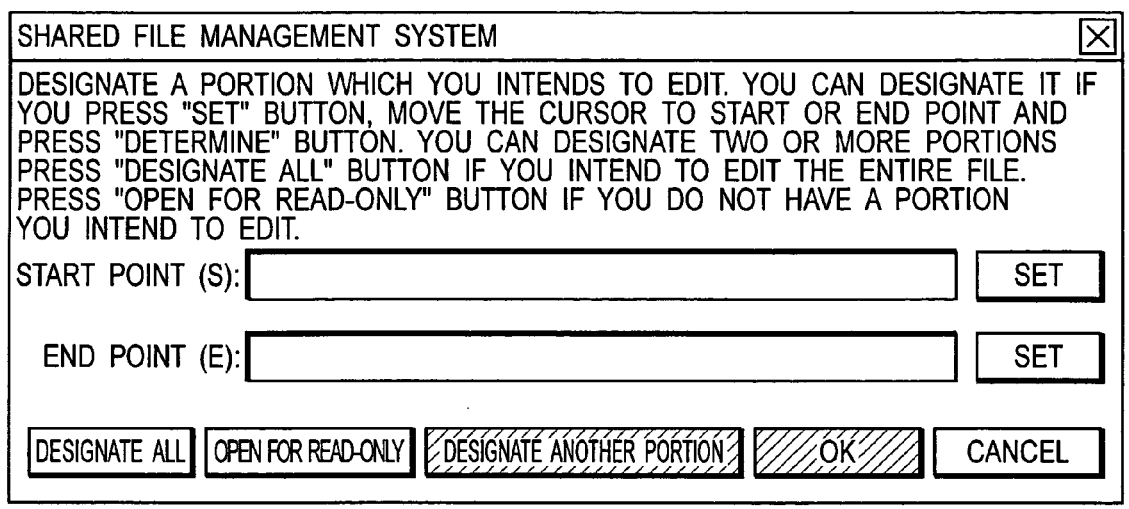
FIG. 27 is a diagram of a seventh graphic user interface for designating a portion which a user intends to edit.

A flowchart for a file management program according to a fourth embodiment is shown in FIGS. 25 and 26. The only difference from the file management program according to the first embodiment (FIG. 4) is a processing when a shared file is accessed first (that is, when it is decided NO at step S12). In this case, first a graphic user interface for designating an editing intending portion shown in FIG. 27 is displayed in the screen of the user "A" (S44). In this graphic user interface, an editing intending portion can be designated similarly to the graphic user interface of the first embodiment shown in FIG. 6, but further "Designate all" button and "Open for read-only" button are added. If a possibility that other users will edit the file is low, of if the first user intends to edit the entire file, when "Designate all" button is pressed, the entire file is designated as the editing intending portion. "Open for read-only" button is pressed when editing is not performed.

When "Designate all" button is pressed (YES at S46), editing right is given to user "A" and the file is opened (S14). When "Open for read-only" button is pressed (YES at S48), the file is opened for read-only (S50). Otherwise, when an editing intending portion is designated by user "A" (S52), the editing right to the portion is given to user "A", and the file is opened (S54).

Needless to say, the processing for designating an editing intending portion shown in FIG. 27 may be adopted as modified examples in the file management system according to the second and third embodiments.

In any of the above-mentioned embodiments, it is assumed that only one user is editing a shared file. However, when a plurality of users edit a shared file, the editing portions therefor are set so as not to overlap each other, the processing therefor is similar to the flowchart as shown in FIGS. 4, 6 and 25-26.

In the above-mentioned embodiments, a file including mainly text data is dealt with. However, the invention can be applied to any file in which a portion (or a range) can be designated uniquely. For example, similarly to the above-mentioned embodiments, a user designates a range of cells in a spreadsheet application (wherein a cell is a smallest unit of area for inputting data), and requests a user having editing right to the range of cells to assign the editing right. When the editing right is assigned, the range of cells can be edited. Thus, a plurality of users can edit the same file at different ranges at the same time.

As explained above, the above-mentioned systems for managing shared files in a network manage users having editing rights and editing portions thereof. Because a user who has editing right actually permits editing, a plurality of users can edit a file at different portions at the same time, without editing the same portion at the same time, and the contents in a file stored previously by a user is not overwritten by contents stored by another user thereafter.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for managing files shared by a plurality of client apparatuses in a server apparatus connected through a network to the plurality of client apparatuses, the method comprising:
    receiving an access request to a file among the shared files from a first client apparatus among the plurality of client apparatuses;
    deciding whether the file is being edited by any other client apparatus among the plurality of client apparatuses or not based on file management data which includes access information of the shared files;
    when it is decided that the file is being edited by no other client apparatus among the plurality of client apparatuses, allowing the first client apparatus to open the file and permit editing of the file by the first client apparatus; and
    when it is decided that the file is being edited by a second client apparatus among the plurality of client apparatuses, the second client apparatus editing the file including a portion which the first client apparatus intends to edit, presenting to the second client apparatus a first graphic user interface for requesting the second client apparatus whether to permit or to reject editing of the portion by the first client apparatus, and when a notification to permit editing of the portion is received from the second client apparatus, allowing the first client apparatus to open the file in a status wherein and permit editing of the portion by the first client apparatus.

2. The method according to claim 1, wherein in the step of presenting the first graphic user interface, when a part of the portion designated by the first client apparatus is already edited by the second client apparatus, the first graphic user interface is presented for requesting the second client apparatus whether to permit or to reject editing of the portion except the part of the portion already edited by the second client apparatus.

3. The method according to claim 1, wherein in the step of allowing the first client operator to open the file, the file is overwritten and stored before opening the file when the portion is already edited by the second client apparatus.

4. The method according to claim 1,
    wherein in the step of presenting to the second client apparatus the first graphic user interface, the first graphic user interface is presented to make it possible to reject the editing of only a part of the portion, and
    wherein in the step of allowing the first client apparatus to open the file, when rejection of editing of only the part of the portion is notified by the second client apparatus, allowing the first client apparatus to open the file such that editing of the portion by the first client apparatus is permitted except the part of the portion rejected by the second client for editing.

5. The method according to claim 1, further comprising the steps of:
    presenting to the first client apparatus a second graphic user interface for designating the portion of the file which the first client apparatus intends to edit when the file is already edited by the second client apparatus; and
    receiving the designation of the portion in the second graphic user interface.

6. The method according to claim 1, wherein in the step of receiving the access to the file, a designation of the portion of the file which the first client apparatus intends to edit is also accepted.

7. The method according to claim 1,
    wherein the step of allowing the first client apparatus to open the file when the file is not being edited by any other client further comprising the step of presenting a second graphic user interface for designating the portion of the file which the first client apparatus intends to edit, and when the portion is designated in the second graphic user interface, and
    wherein in the step of allowing the first client apparatus to open the file, the file is opened such that editing of the portion by the first client apparatus is permitted.

8. The method according to claim 1, further comprising the step of allowing the first client apparatus to open the entire file in a read-only mode until permission of editing of the portion is notified by the second client apparatus.

9. A server apparatus connected through a network to a plurality of client apparatuses and managing files shared by the plurality of client apparatuses, comprising:
    a first storage device which stores the shared files;
    a second storage device which stores file management data including access status information of the shared files stored in said first storage device;
    a receiver which receives an access request to a file among the shared files by a first client apparatus among the plurality of client apparatuses;
    a decider which decides whether the file is being edited by any other client apparatus among the plurality of client apparatuses or not based on the file management data; and
    a file manager which when said decider decides that the file is being edited by no other client apparatus among the plurality of client apparatuses, allows the first client apparatus to open the file and permits editing of the file by the first client apparatus, and when the determiner determines that the file is being edited by a second client apparatus, presents to the second client apparatus a first graphic user interface for requesting the second client apparatus whether to permit or to reject editing of the portion by the first client apparatus, and when a notification to permit editing of the portion is received from the second client apparatus, allows the first client apparatus to open the file and permit editing of the portion by the first client apparatus.

10. The server according to claim 9, wherein said file manager presents the first graphic user interface for requesting the second client apparatus whether to permit or to reject editing of the portion except a part of the portion already edited by the second client apparatus, when the portion designated by the first client apparatus is already edited by the second client apparatus.

11. The server according to claim 9, wherein said file manager allows the first client operator to open the file after overwriting and storing the portion when the portion is already edited by the second client apparatus.

12. The server according to claim 9, wherein said file manager presents the first graphic user interface to make it possible to reject the editing of only a part of the portion, and allows the first client apparatus to open the file, when rejection of editing of only the part of the portion is notified by the second client apparatus such that editing of the portion by the first client apparatus is permitted except the part of the portion rejected by the second client for editing.

13. The server according to claim 9, wherein said file manager further presents to the first client apparatus a second graphic user interface for designating the portion of the file which the first client apparatus intends to edit when the file is already edited by the second client apparatus, and receives the designation of the portion in the second graphic user interface.

14. The server according to claim 9, wherein said receiver further receives a designation of the portion of the file which the first client apparatus intends to edit.

15. The server according to claim 9, wherein said file manager further presents a second graphic user interface for designating the portion of the file which the first client apparatus intends to edit when the file is not edited by any other client, and open the file such that editing of the portion by the first client apparatus is permitted when the portion is designated in the second graphic user interface.

16. The server according to claim 9, wherein said file manager allows to open the entire file in a read-only mode until permission of editing of the portion is notified by the second client apparatus.

17. A shared file management system, comprising:
a plurality of client apparatus; and
a server apparatus which manages files shared by the plurality of client apparatus through a network;
wherein said server apparatus comprises:
a first storage device which stores the shared files;
a second storage device which stores file management data including access status information of the shared files stored in said first storage device;
a receiver which receives an access request to a file among the shared files by a first client apparatus among the plurality of client apparatuses;
a decider which decides whether the file is being edited by any other client apparatus among the plurality of client apparatuses or not based on the file management data; and
a file manager which when said decider decides that the file is being edited by no other client apparatus among the plurality of client apparatuses, allows the first client apparatus to open the file and permits editing of the file by the first client apparatus, and when the determiner determines that the file is being edited by a second client apparatus, presents to the second client apparatus a first graphic user interface for requesting the second client apparatus whether to permit or to reject editing of the portion by the first client apparatus, and when a notification to permit editing of the portion is received from the second client apparatus, allows the first client apparatus to open the file and permit editing of the portion by the first client apparatus.

18. A computer-readable storage medium storing a program for managing files shared by a plurality of client apparatuses through a network, the program comprising the steps of:
receiving an access request to a file among the shared files from a first client apparatus among the plurality of client apparatuses;
deciding whether the file is being edited by any other client apparatus among the plurality of client apparatuses or not based on file management data which includes access information of the shared files;
when it is decided that the file is being edited by no other client apparatus among the plurality of client apparatuses, allowing the first client apparatus to open the file and permit editing of the file by the first client apparatus; and
when it is decided that the file is being edited by a second client apparatus among the plurality of client apparatuses, the second client apparatus editing the file including a portion which the first client apparatus intends to edit, presenting to the second client apparatus a first graphic user interface for requesting the second client apparatus whether to permit or to reject editing of the portion by the first client apparatus, and when a notification to permit editing of the portion is received from the second client apparatus, allowing the first client apparatus to open the file in a status wherein and permit editing of the portion by the first client apparatus.

19. A method of managing shared files, comprising:
receiving a request to edit a file from a first client in a network;
determining whether or not any other client in the network has an editing right to the file;
receiving a designation of one or more portions of the file to edit from the first client when it is determined that another client in the network has the editing right to the file; and
for each designated portion of the file designated by the first client, performing the steps of
determining a second client that has an editing right to the designated portion of the file;
making a request to the second client to allow the first client to edit the designated portion of the file; and
granting the editing right to the designated portion of the file to the first client when the second client grants permission to allow the first client to edit the designated portion of the file,
wherein each of the designated portions of the file is less than a whole of the file.

20. The method of claim 19, further comprising assigning the editing right to the file to the first client when it is determined that no other client in the network has the editing right to the file.

21. The method of claim 19, wherein there is no overlap between any of the designated portions of the file.

22. The method of claim 19, wherein receiving non-contiguous designated portions is allowed.

23. The method of claim 19, wherein the steps performed for each designated portion of the file further comprises determining whether a part of the designated portion of the file has been modified.

24. The method of claim 23, wherein when it is determined that the part of the designated portion of the file has been modified, the steps performed for each designated portion of the file further comprises refusing the editing right to the designated portion of the file to the first client.

25. The method of claim 24, wherein when it is determined that the part of the designated portion of the file has been modified, the step of making the request to the second client to allow the first client to edit the designated portion of the file is not performed.

26. The method of claim 23, wherein when it is determined that the part of the designated portion of the file has been modified,
the step of making the request to the second client comprises making a request to the second client to allow the first client to edit a part of the designated portion of the file other than the modified part of the designated portion of the file, and the step of granting the editing right to the designated portion of the file to the first client when the second client grants permission comprises granting the editing right to the other part of the designated portion of the file to the first client when the second client grants permission to allow the first client to edit the other part of the designated portion of the file.

27. The method of claim 23, wherein when it is determined that the part of the designated portion of the file has been modified and when the second client grants permission to allow the first client to edit the other part of the designated portion of the file, the steps performed for each designated portion further comprises saving the designated portion with the modified part prior to performing the step of granting the editing right to the designated portion of the file to the first client.

28. The method of claim 27, wherein the designated portion of the file is saved in a server on the network.

29. The method of claim 19, when it is determined no other client in the network has the editing right to the file, the method further comprising:

receiving, from the first client, a designation of an entirety of the file to edit or the one of the designation of one or more portions of the file to edit;

assigning the editing right to the file to the first client when the designation of the entirety of the file to edit is received; and assigning the editing right corresponding to each designated portion when the designation of one or more portions of the file to edit is received.

30. The method of claim 29, further comprising opening the file in a read-only mode to the first client when it is determined that another client in the network has the editing right to the file.

31. The method of claim 30, wherein the steps performed for each designated portion of the file further comprises changing a mode of the file such that editing by the first client to the designated portion is allowed when the second client grants permission to allow the first client to edit the designated portion of the file.

* * * * *

UNITED STATES PATENT AND TRADEMARK OFFICE
CERTIFICATE OF CORRECTION

| | | |
|---|---|---|
| PATENT NO. | : 7,584,199 B2 | Page 1 of 1 |
| APPLICATION NO. | : 10/975007 | |
| DATED | : September 1, 2009 | |
| INVENTOR(S) | : Katsuhiko Matsusaka | |

It is certified that error appears in the above-identified patent and that said Letters Patent is hereby corrected as shown below:

On the Title Page:

The first or sole Notice should read

--Subject to any disclaimer, the term of this patent is extended or adjusted under 35 U.S.C. 154(b) by 518 days.--.

Claim 1, Column 11, Line 25: delete "it is decided"; and add --the result of said deciding is--.
[Should read: when the result of said deciding is ...]

Claim 1, Column 11, Line 30: delete "it is decided"; and add --the result of said deciding is--.
[Should read: when the result of said deciding is ...]

Claim 19, Column 14, Line 24: delete "it is determined"; and add --the result of said determining is--.
[Should read: to edit from the first client when the result of said determining is ...]

Claim 19, Column 14, Line 39: add --and wherein there is no overlap between any of the designated portions of the file--.
[Should read: than a whole of the file and wherein there is no overlap between any of the designated portions of the file.]

Claim 21, Column 14, Lines 44-45: delete this claim in its entirety.

Signed and Sealed this

Fourteenth Day of September, 2010

David J. Kappos
*Director of the United States Patent and Trademark Office*